United States Patent Office 3,066,169
Patented Nov. 27, 1962

3,066,169
PREPARATION OF POLYNITRO-NITRAMINES
Henry Feuer, West Lafayette, Ind., and Robert Miller, East Paterson, N.J., assignors to Purdue Research Foundation, West Lafayette, Ind., a corporation of Indiana
No Drawing. Filed Dec. 26, 1958, Ser. No. 783,654
5 Claims. (Cl. 260—584)

Our invention relates to novel polynitro-nitramines and more particularly, it relates to the polynitro-nitramines prepared by the interaction of 2-nitroalkyl esters with a salt of the primary aliphatic or aromatic nitramine in the presence of a weak base.

The polynitro-nitramine monomers produced in accordance with our invention have the following structural formula:

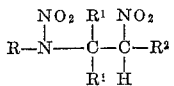

where R is either butyl or the radical:

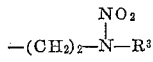

where $R^1$ is hydrogen or methyl; where $R^2$ is hydrogen, methyl, ethyl, or the radical:

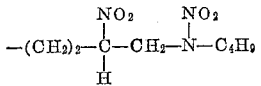

and where $R^3$ is mononitrobutyl with the proviso that when $R^2$ is the radical:

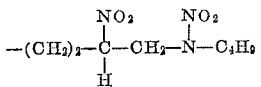

then R must be butyl.

Typical polynitro-nitramines which we can obtain according to our new process include:

2,11-diaza-3,10-diphenyl-2,4,9,11-tetranitrododecane,
1,9-dicarbethoxy-2,8-diethyl-1,3,7,9-tetranitro-3,7,-diazanonane,
4-cyclohexyl-4-aza-3-methyl-2,4-dinitrobutane,
1,1,3,5,7,7-hexanitro-3,5-diazaheptane,
4-aza-2,4-dinitro-1-pentanol
4-aza-2,4-dinitro-hexanamide,
N,N¹-bis(2-nitropropyl)-p-phenyldinitramine,
4-phenyl-3,3-dimethyl-4-aza-2,4-dinitrobutanal,
4,14-diaza-2,4,14,16-tetranitro-1,17-heptadecanediol,
3,8-diphenyl-4,7-diaza-2,4,7,9-tetranitrodecanedial,
1,2,14,15-tetraphenyl-2,14-dimethyl-1,15-diaza-1,3,13,15-tetranitropentadecane,
3,9-diaza-3,5,7,9-tetranitroundecane,
1,2,2,6,6,7-hexaphenyl-1,7-diaza-1,3,5,7-tetranitroheptane,
4,15-diaza-2,4,15,17-tetranitrooctadecane,
1-cyclopentyl-1-aza-2-ethyl-1,3-dinitropentane,
4-aza-3-heptyl-2,4-dinitroheptane,
5-(p-tolyl)-5-aza-4,4'-diheptyl-3,5-dinitropentane,
1-phenyl-3-aza-3-(3',5'-dimethylphenyl)-1,3-dinitropropane,
3-aza-3,5-dinitrotridecane,
1-benzyl-1-aza-1,3-dinitropropane,
4-aza-11-ethyl-11-propyl-4,6,10-trinitrotetradecane,
1-phenoxy-4-aza-2,4-dinitrononane,
1-nonanoxy-4-aza-2,4-dinitrononane,
3,7-diaza-1,1,3,7-tetranitrooctane,
1,5-diaza-1-phenyl-1,5,7,7-tetranitroheptane,
nonyl 4-aza-2,4-dinitroheptanoate,
phenyl 3-methyl-4-aza-2,4-dinitroheptanoate,
4-aza-5-methyl-7-keto-4,6-dinitrododecanamide,
1-phenyl-4-aza-2,4-dinitro-1-hexanone,
1-phenyl-7-aza-2,5,7-trinitrononane,
8-cycloheptyl-8-aza-3,6,8-trinitro-1-octanol,1-butoxy-8-aza-7-methyl-3,6,8-trinitrodecane,
3,6-diaza-1,3,6,8-tetranitrooctane,
6,11-diaza-4,6,11,13-tetranitrohexadecane,
1,8-diphenyl-3,6-diaza-1,3,6,8-tetranitrooctane,
4,7-diaza-2,4,7,9-tetranitrodecanediamide,
1,10-dibenzoyl-3,8-diaza-1,3,8,10-tetranitrodecane,
1,11-diethoxy-4,8-diaza-2,4,8,10-tetranitroundecane,
5,15-diaza-5,7,12,14-tetranitrooctadecane,
1,10-di(p-nitrophenyl)-1,10-diaza-1,3,8,10-tetranitrodecane.

Our new polynitro-nitramines are produced by reacting a 2-nitroalkyl ester with a salt of a primary aliphatic or aromatic nitramine in the presence of a weak base, in a suitable solvent, and at temperatures sightly above room temperature.

The nitro-esters which we employ in preparing our polynitro-nitramine compounds have the following structural formula:

where $R^7$ is alkyl having up to ten carbon atoms, aryl, nitro, —$CO_2R^4$, hydroxymethyl, carbamyl,

and

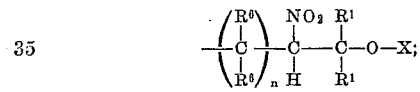

where $R^4$ is alkyl or aryl, $R^5$ is alkyl up to 10 carbon atoms or aryl, $R^6$ is hydrogen and $n$ is an integer ranging from 1–10 X is $$-\overset{O}{\underset{\|}{C}}Y$$

—$SO_2Y$, $SO_3H$, —$NO_2$, —$PO_3H_2$ and other phosphoric acid radicals; and Y is hydrogen, alkyl and aryl. Examples of 2-nitroalkyl esters which we can employ include:

2-nitrobutylacetate,
2-nitrobutyl formate,
2-nitrobutyl phosphate,
2-nitrobutyl nitrate,
2-nitrobutyl sulfonate,
2,5-dinitrohexyl acetate,
2,2-dinitroethyl acetate,
2,4,4-trinitro-3,3-dimethylbutyl acetate,
2-nitro-2-phenylethyl acetate,
2-nitro-1-phenylbutyl acetate,
1,6-diacetoxy-2,5-dinitrohexane,
2-carbethoxy-2-nitroethyl acetate,
2-acetoxy-3-nitrobutane,
1,7-diacetoxy-1,7-diphenyl-2,6-dinitroheptane,
3-acetoxy-3-methyl-2-nitrobutanamide,
2-(2-acetoxy-3-nitropropoxy)tetrahydropyran,
diethyl acetal of 3-acetoxy-4-nitro-2-pentanone,
3-acetoxy-4-nitrohexane,
2-nitro-3-acetoxydecane,
3-nitro-4-acetoxy-4-heptylundecane,
1-acetoxy-2-nitro-2-phenylethane,
1-acetoxy-2-nitrodecane,
2-nitroethyl acetate,
1-acetoxy-2,6-dinitro-7-ethyl-7-propyldecane,
1-acetoxy-2-nitro-3-phenoxypropane, 1-acetoxy-2-nitro-3-nonanoxypropane,
nonyl 3-acetoxy-2-nitropropionate,
phenyl 3-acetoxy-2-nitrobutanoate,
2-acetoxy-3-nitro-4-nonanone,
1-pheny-2-nitro-3-acetoxy-1-propanone,
1-acetoxy-2,6-dinitroundecane,
1-acetoxy-6-phenyl-2,5-dinitrohexane,
7-acetoxy-3,6-dinitro-1-heptanol,
2-acetoxy-3,6-dinitro-8-butoxyoctane,
2-nitroethyl acetate, 1-acetoxy-2-nitropentane,
1-acetoxy-2-nitro-2-phenylethane,
3-acetoxy-2-nitropropanamide,
1-acetoxy-2-nitro-2-benzoylethane,
1-acetoxy-2-nitro-3-ethoxypropane,
1,8-diacetoxy-2,7-dinitrooctane.

Aliphatic or aromatic nitramines which are operative in forming the compounds of our invention have the following structural formula:

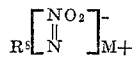

where $R^8$ is alkyl, aryl, lower alkanamide, $$-(CH_2)_n-N=NO_2$$

and

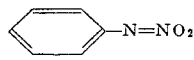

where $n$ is an integer ranging from 1–10; M is a metal ion from the alkali metal or the alkaline earth metal group with the proviso that where the 2-nitroester is other than a monoester, M contains one metal ion per molecule.

The weak bases which can be used in carrying out our process for the production of polynitro-nitramine compounds include carbonates, bicarbonates; sulfites, phosphates, borates; compounds such as sodium acetate, sodim hydroxide, and other similar alkali metal and alkaline earth metal hydroxides; and alkali metal lower alkyl esters and the like.

Our reaction for the production of polynitronitramine compounds from 2-nitroakyl esters and the salts of various nitramines in the presence of a weak base is effected in solvents inert to the reactants and resulting polynitronitramines, as for example, methanol, tetrahydrofuran, dimethyl sulfoxide, dimethylformamide, etc.

The reaction can be carried out at temperatures ranging from 0–100° C. The reaction temperature of 30–40° C. at atmospheric pressure will result in optimum formation of polynitro-nitramine in about 18–24 hours.

Our compounds and process can be used to form polymers useful as both solid and liquid propellants for reaction motors. Our compounds, and their resulting polymers, are also relatively stable to shock, heat, etc. to the extent that, as a rule, additional stabilizers are not required in the propellant mixtures. Our monomers have been found to be plasticizers for nitropolymers formed from the said monomers.

Our propellants are generally rich in fuel elements and, as such, can be utilized as a fuel in the process of U.S. Patent No. 2,537,526 where tetranitromethane and hexanitroethane were used as oxidants and liquid nitroparaffins containing excess reducing potentials were used as fuels; in the processes described in U.S. Patents Nos. 2,582,048 and 2,548,803 where nitro substituted aliphatic compounds having more than one nitro group per carbon atom were used as oxidants and nitro substituted compounds having less than one nitro group per carbon atom were used as fuels in monopropellant systems; or in the similar process of U.S. Patent No. 2,590,009.

We have found that, generally, the solid polymers formed by the process of our invention can be dissolved in polar solvent, such as dimethylformamide and lower nitro alkanes, such as tetranitromethane, and, as such, are operative as fuels in the above-described processes. Other solvents where can be used to liquify our polymers include hydrazine, lower alkyl amines, dimethyl sulfoxide, ethylene glycol monoethyl ether, acetonitrile, lower alkanols, lower alkanols, lower nitro esters, and nitro ethers.

Rubber-like materials can be prepared by inter-action of diisocyanates with many of our compounds, for example, 4,14-diaza-2,4,14,16-tetranitro-1,17-heptadecanediol, etc. Our acidic compounds can be reacted with polynitrodiols and polynitrodiamines to produce polynitro polyesters and polynitro polyamides.

Our polymers can be mixed with various oxidant salts, such as ammonium nitrate, ammonium perchlorate, lithium perchlorate, etc. to obtain solid heterogeneous propellants, having specific impulses on the order of that of Ballistite.

The following examples are offered to illustrate our invention; however, we do not intend to be limited to the specific proportions, materials, or conditions employed, but rather we intend to include within the scope of our invention all equivalents obvious to those skilled in the art.

*Example I*

In a 300 ml. three-necked flask equipped with a mechanical stirrer, condenser and thermometer, was dissolved 4.1 g. (0.1 mole) of 98% assay sodium hydroxide in 35 ml. of water. The solution was cooled to 0–2° and 7.5 g. (0.05 mole) of ethylene dinitramine was added all at once. Then 8.2 g. (0.1 mole) of anhydrous sodium acetate was added, and the mixture was allowed to stir until salt formation was complete. At this time 16.1 g. (0.1 mole) of 2-nitrobutyl acetate was added all at once, employing 100 ml. of methanol for washing. The reaction was stirred for 22 hours at 35–38° and at the end of this time the reaction mixture was cooled to room temperature and filtered, yielding 14.3 g. of solid 5,8-diaza-3,5,8,10-tetranitrodecane haivng a melting range of 122–124° (yield 81%).

Separation of the diastereoisomers was accomplished by dissolving the solid in hot methanol, and cooling the solution. The high melting isomer crystallized out preferentially. Subsequent recrystallizatons from methanol yielded a white solid, M.P. 131–132° C.

*Anal.*—Calculated for $C_{10}H_{20}N_6O_8$: C. 34.09; H, 5.68; N, 23.86. Found: 33.87; H, 5.70; N, 23.70.

Evaporation of the methanol yielded the lower melting isomer. This solid was fractionally recrystallized from 95% ethanol, M.P. 100–101°.

*Anal.*—Calculated for $C_{10}H_{20}N_6O_8$: C, 34.09; H, 5.68; N, 23.86. Found: C, 33.96; H, 5.78; N, 24.06.

*Example II*

To a 300 ml., three-necked round bottomed flask, equipped with a condenser, a thermometer and a stirrer, containing 4.04 g. (0.1 mole) of 99% assay sodium hydroxide dissolved in a mixture of 45 ml. of water and 170 ml. of tert. butanol at 0–5°, were added 7.5 g. (0.05 mole) of ethylene dinitramine and 8.2 g. (0.1 mole) of anhydrous sodium acetate. After salt formation was complete, the reaction was allowed to come to room temperature and 16.1 g. (0.1 mole) of 3-nitro-2-butyl acetate was added all at once. The reaction was heated to 39–41° for 48 hours. At the end of this time, the tert.-butanol was removed in vacuo, and the water was decanted off, leaving an oily solid residue. This oily residue solidified after being shaken with a small portion of 95% ethanol, which had been cooled to 0° C. The solid 4,7-diaza-3,8-dimethyl-2,4,7,9-tetranitrodecane thus obtained was recrystallized from methanol, yielding 3.7 g. or a 21% yield of product (M.P. 120–1220°). Subsequent recrystallization from methanol and cleaning with decoloring charcoal yielded the analytical sample (M.P. 124.5–125.5°).

*Anal.*—Calculated for $C_{10}H_{20}N_6O_8$: C, 34.09; H, 5.72; N, 23.86. Found: C, 34.16; H, 5.91; N, 24.04.

Example III

To a 100 ml. three-necked round bottomed flask equipped with a stirrer, a condenser and a thermometer, containing 0.81 g. (0.02 mole) of 98% assay sodium hydroxide dissolved in a mixture of 10 ml. of water and 70 ml. of methanol at 0–5°, were added 1.64 g. (0.02 mole) of anhydrous sodium acetate and 2.36 g. (0.02 mole) of 1-nitraminobutane. The reaction was allowed to come to room temperature, and after salt formation was complete, 2.92 g. (0.01 mole) of 1,6-diacetoxy-2,5-dinitrohexane was added all at once. The reaction was run at 24° for 15 hours and then at 38–40° for seven hours more. At the end of this time the reaction mixture was cooled in an ice bath and filtered, yielding 3.6 g. or an 88% yield of 5,12-diaza-5,7,10,12-tetranitrohexadecane (M.P. 118–121° dec.). One of the diastereoisomers was removed by triturating the product with hot diisopropyl ether. Subsequent cooling of the ether and filtration yielded a white powder (M.P. 135–137° dec.). Several more recrystallizations from diisopropyl ether yielded the analytical sample, M.P. 139–140° dec. Infrared spectra of the crude product, analytical sample and the residue remaining after triturating were all very similar, indicating that the crude material obtained (M.P. 118–121° dec.) from the reaction consisted entirely of diastereoisomeric material.

*Anal.*—Calculated for $C_{14}H_{28}N_6O_8$: C, 41.17; H, 6.91; N, 20.58. Found: C, 40.94; H, 6.83, N, 20.29.

Example IV

To a three-necked, 200 ml. round bottomed flask equipped with a thermometer, a condenser, and a mechanical stirrer, containing 4.04 g. (0.1 mole) of 99% assay sodium hydroxide and 8.2 g. (0.1 mole) of anhydrous sodium acetate dissolved in a mixture of 25 ml. of water and 110 ml. of methanol at 0–5°, was added 11.8 g. (0.1 mole) of 1-nitraminobutane. After salt formation was complete, 16.1 g. (0.1 mole) of 2-nitrobutyl acetate was added all at once. The reaction mixture was then heated to 39–41° for 22 hours. At the end of this time, the methanol was removed in vacuo, and the residual liquid was extracted with several portions of ether. The ether extracts were combined and the ether was removed in vacuo, leaving a yellow oil, 5-aza-3,5-dinitrononane. This oil was distilled under vacuum, yielding a fraction at 40° at 1 micron of pressure. An infrared spectrum of this material revealed a small N—H band at 3μ. This band was probably due to a small amount of unreacted 1-nitroaminobutane. Subsequent distillations, to remove the unreacted material were unsuccessful because of the low pressures that had to be employed.

Now having described our invention what we claim is:

1. Compounds having the following structural formula:

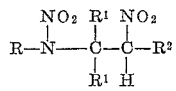

where R is selected from the group consisting of butyl and the radical.

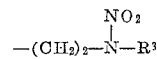

where $R^1$ is selected from the group consisting of hydrogen and methyl; where $R^2$ is selected from the group consisting of hydrogen, methyl, ethyl and the radical:

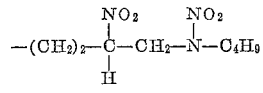

and where $R^3$ is mononitrobutyl with the proviso that when $R^2$ is the radical:

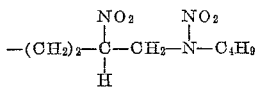

then R must be butyl.

2. 5,8-diaza-3,5,8,10-tetranitrodecane.
3. 4,7-diaza-3,8-dimethyl-2,4,7,9-tetranitrodecane.
4. 5, 12-diaza-5, 7, 10, 12-tetranitrohexadecane.
5. 5-aza-3,5-dinitrononane.

No references cited.